(12) United States Patent
Chang et al.

(10) Patent No.: US 8,891,834 B2
(45) Date of Patent: Nov. 18, 2014

(54) FACE RECOGNITION SYSTEM AND FACE RECOGNITION METHOD THEREOF

(75) Inventors: Wen-Yan Chang, Zhunan Township (TW); Tai-Chang Yang, Kaohsiung (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 351 days.

(21) Appl. No.: 13/463,134

(22) Filed: May 3, 2012

(65) Prior Publication Data

US 2013/0236069 A1    Sep. 12, 2013

(30) Foreign Application Priority Data

Mar. 7, 2012    (TW) .............................. 101107640 A

(51) Int. Cl.
*G06K 9/00*    (2006.01)
(52) U.S. Cl.
USPC ......................................... 382/118; 382/115
(58) Field of Classification Search
None
See application file for complete search history.

(56) References Cited

U.S. PATENT DOCUMENTS

| | | | | |
|---|---|---|---|---|
| 6,035,055 A * | 3/2000 | Wang et al. | .................... | 382/118 |
| 7,336,807 B2 * | 2/2008 | Tabata | .......... | 382/118 |
| 8,340,367 B2 * | 12/2012 | Suzuki et al. | ................. | 382/118 |
| 8,553,983 B2 * | 10/2013 | Imaoka | .......... | 382/190 |
| 2003/0210808 A1 * | 11/2003 | Chen et al. | ..................... | 382/118 |
| 2010/0067750 A1 * | 3/2010 | Matsuo et al. | ................ | 382/118 |
| 2012/0106806 A1 * | 5/2012 | Folta et al. | ..................... | 382/118 |

* cited by examiner

*Primary Examiner* — Matthew Bella
*Assistant Examiner* — Jose M Torres
(74) *Attorney, Agent, or Firm* — Wang Law Firm, Inc.; Li K. Wang; Stephen Hsu

(57) ABSTRACT

A face recognition system and a face recognition method thereof. The face recognition system comprises a storage module, a processing module and a display module. The storage module stores a plurality of face recognition codes, a plurality of face images or face coordinates corresponding to the plurality of face recognition codes. The processing module calculates an overlap rate of the $(T-1)^{th}$ face image that overlaps the $T^{th}$ face image in the plurality of face images. When the overlap rate is greater than a first preset value, the processing module calculates a similarity between the $(T-1)^{th}$ face image and the $T^{th}$ face image. If the similarity is smaller than a second preset value, the processing module retains the face recognition code of the $(T-1)^{th}$ face image. The display module displays the face recognition code in the $T^{th}$ face image.

11 Claims, 5 Drawing Sheets

FACE RECOGNITION SYSTEM AND FACE RECOGNITION METHOD THEREOF

CROSS-REFERENCE TO RELATED APPLICATION

This application claims the benefit of Taiwan Patent Application No. 101107640, filed on Mar. 7, 2012, in the Taiwan Intellectual Property Office, the disclosure of which is incorporated herein in its entirety by reference.

BACKGROUND OF THE INVENTION

1. Field of the Invention

The present invention relates to a face recognition system, and more particularly to the face recognition system and method capable of enhancing the stability of display and the practicality of face recognition.

2. Description of Related Art

In recent years, face recognition technology advances and gradually becomes popular in the application of different consumer products, and handheld products, such as cameras and mobile phones, are generally integrate with the face recognition function for convenient portability and generality.

In conventional face recognition designs, face recognition is implemented upon each single image, and the detected faces in the image are labeled names upon the identification result and displayed on an operating interface. However, the accuracy of identification result made by the face recognition technology may be affected easily by a change of light source or angle, and one or more images may be misjudged or determined to be having no name. In a live-view image pickup, the information label of characters may or may not be displayed due to variance of accuracy, or many name-tags are updated frequently to cause a blinking display. Therefore, users may observe the flickering name-tag displayed or a wrong identification of names that causes a continuous flickering screen. The conventional face recognition designs affect the user's impression and the product stability adversely.

Therefore, it is an urgent and important issue for related designers and manufacturers to design a stable mechanism to be applied in the face recognition in order to improve the stability of the display after the recognition takes place and avoid the flickering name-tags or a misjudgment that causes a continuous flickering screen.

SUMMARY OF THE INVENTION

In view of the aforementioned problems of the prior art, it is a primary objective of the invention to provide a face recognition system and a face recognition method thereof to overcome the problem of the conventional face recognition system and method being affected by light source, angle or the computing ability of the handheld device and giving rise to a problem of instability.

To achieve the foregoing object, the present invention provides a face recognition system, comprising a storage module, a processing module and a display module. The storage module stores a plurality of face recognition codes, a plurality of face images corresponding to the plurality of face recognition codes or face coordinates in the plurality of face images. The processing module calculates an overlap rate of a $(T-1)^{th}$ face image that overlaps a $T^{th}$ face image in the plurality of face images, and wherein when the processing module determines that the overlap rate is greater than a first preset value, the processing module will calculate a similarity between the $(T-1)^{th}$ face image and the $T^{th}$ face image, and if the similarity is smaller than a second preset value, the processing module will retain the face recognition code of the $(T-1)^{th}$ face image. The display module displays the corresponding face recognition code in the $T^{th}$ face image. Wherein, T is a positive integer greater than zero.

Wherein, when the processing module determines that the similarity is greater than the second preset value, the processing module compares the face recognition codes of the $(T-1)^{th}$ face image with the $T^{th}$ face image; and if the face recognition codes of the $(T-1)^{th}$ face image and the $T^{th}$ face image are different, the processing module calculates the update frequency of the plurality of face recognition codes from the $(T-1)^{th}$ face image to the $T^{th}$ face image, and determines whether the update frequency is greater than a third preset value; and if the update frequency is greater than the third preset value, the processing module updates the face recognition code of the $T^{th}$ face image.

Wherein, when the processing module determines that the similarity is greater than the second preset value, the processing module compares the face recognition codes of the $(T-1)^{th}$ face image with the $T^{th}$ face image; and the processing module retains the face recognition code of the $(T-1)^{th}$ face image, when the face recognition codes of the $(T-1)^{th}$ face image and the $T^{th}$ face image are the same.

Wherein, when the processing module determines that the overlap rate of the face coordinates in the plurality of face images is smaller than the first preset value, the processing module accumulates a depletion value; and determines whether the depletion value is greater than a fourth preset value; and the processing module deletes the face coordinates of the plurality of face images or the plurality of face recognition codes of the face coordinates, if the processing module determines that the depletion value is greater than the fourth preset value.

Wherein, the processing module retains the face coordinates in the plurality of face images or the plurality of face recognition codes of the face coordinates when the processing module determines that the depletion value is smaller than the fourth preset value.

Wherein, when the processing module accumulates the depletion value, the processing module calculates the similarity according to the plurality of face images and determines whether the similarity is greater than the second preset value.

Wherein, when the processing module determines that the similarity is greater than the second preset value, the processing module adds a new face recognition code into the plurality of corresponding face images.

Wherein, when the processing module determines that the similarity is smaller than the second preset value, the processing module retains the plurality of face recognition codes of the $(T-1)^{th}$ face image.

Wherein, the face recognition system further comprises a recognition module for identifying the plurality of face images to obtain the face recognition code corresponding to the plurality of face images or a corresponding similarity of the plurality of face images.

Wherein, the face recognition system further comprises a filtering module for sorting the plurality of face images with the same face recognition code according to the corresponding similarity, and obtaining the plurality of face images with a similarity greater than a fifth preset value, and filtering the plurality of face images with a corresponding similarity smaller than the fifth preset value.

To achieve the foregoing objective, the present invention further provides a face recognition method applied in a face recognition system, and the face recognition system comprises a storage module, a processing module and a display module, and the face recognition method comprises the steps of: using the storage module to store a plurality of face recognition codes, a plurality of face images corresponding to the plurality of face recognition codes, or face coordinates in the plurality of face images; using the processing module to calculate an overlap rate of a $(T-1)^{th}$ face image that overlaps a $T^{th}$ face image in the plurality of face images; using the processing module to calculate a similarity between the $(T-1)^{th}$ face image and the $T^{th}$ face image, if the processing module determines that the overlap rate is greater than a first preset value; using the processing module to retain the face recognition code of the $(T-1)^{th}$ face image, if the similarity is smaller than a second preset value; and using the display module to display the corresponding face recognition code in the $T^{th}$ face image; wherein, T is a positive integer greater than zero.

In summation, the face recognition system and method of the present invention have one or more of the following advantages:

(1) The face recognition system and method of the present invention can overcome the conventional face recognition system and method having a low stability, causing a flickering name-tag or wrong name identification, and producing a continuous flickering screen.

(2) The face recognition system and method of the present invention can enhance the stability of the display after the identification takes place, and the system can keep executing the face recognition regardless of the name-tag being replaced or not, so as to improve the stability and smoothness of the face recognition.

DETAILED DESCRIPTION OF THE PREFERRED EMBODIMENTS

The technical contents and characteristics of the present invention will be apparent with the detailed description of a preferred embodiment accompanied with related drawings as follows. The drawings are provided for the purpose of illustrating the invention but not necessarily drawn according to the actual scale or precision or limited thereto. For simplicity, same numerals are used in the following preferred embodiment to represent respective same elements.

The face recognition system and the face recognition method thereof of the present invention are applied in a handheld device or an image pickup device including but not limited to a tablet PC, a Smartphone, a personal digital assistant (PDA), an ultra mobile PC (UMPC), a camera phone, a digital camera, a digital video camera or a terminal.

Figure 1:
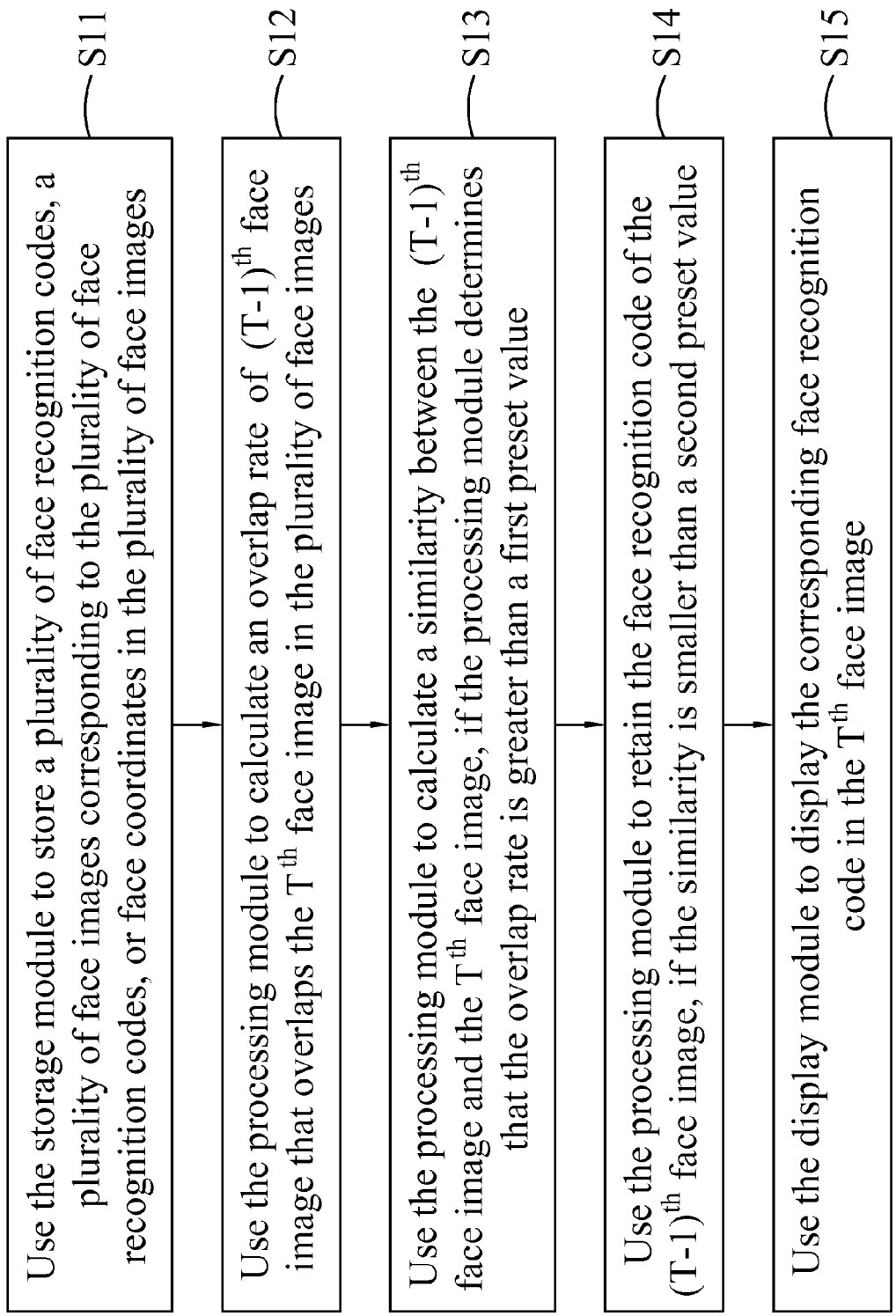
FIG. 1 is a flow chart of a face recognition method in accordance with a first preferred embodiment of the present invention.

With reference to FIG. 1 for a flow chart of a face recognition method in accordance with the first preferred embodiment of the present invention, the face recognition method is applied in a face recognition system, and the face recognition system comprise a storage module, a processing module and a display module. Wherein, the storage module can be an embedded memory, an external memory or a combination thereof. The processing module can be a central processing unit (CPU) or a micro-processing unit electrically coupled to the display module. The display module can be a liquid crystal display (LCD) or a touch LCD panel. The face recognition method of the present invention comprises the following steps:

S11: Use the storage module to store a plurality of face recognition codes, a plurality of face images corresponding to the plurality of face recognition codes, or face coordinates in the plurality of face images.

S12: Use the processing module to calculate an overlap rate of the $(T-1)^{th}$ face image that overlaps the $T^{th}$ face image in the plurality of face images.

S13: Use the processing module to calculate a similarity between the $(T-1)^{th}$ face image and the $T^{th}$ face image, if the processing module determines that the overlap rate is greater than a first preset value.

S14: Use the processing module to retain the face recognition code of the $(T-1)^{th}$ face image, if the similarity is smaller than a second preset value.

S15: Use the display module to display the corresponding face recognition code in the $T^{th}$ face image.

Wherein, T is a positive integer greater than zero, and persons ordinarily skilled in the art can define the numeric values of the first preset value and the second preset flexibly, depending on the requirements of the design.

Based on the first preferred embodiment, the present invention further illustrating the details of the invention by the second preferred embodiment.

Figure 2:
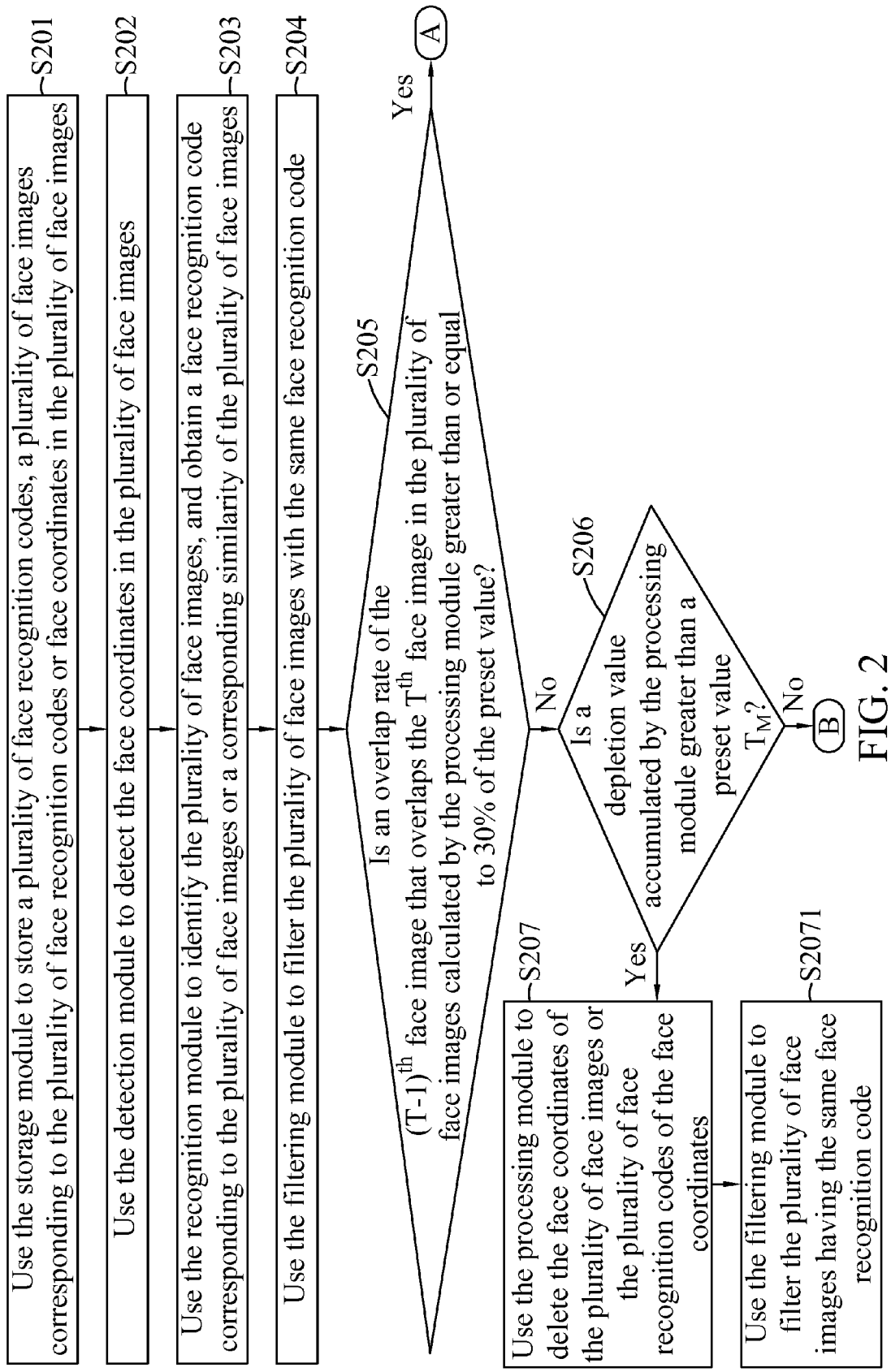
FIG. 2 is a first flow chart of a face recognition method in accordance with a second preferred embodiment of the present invention.

With reference to FIGS. 2, 3, 4 and 5 for the face recognition method in accordance with the first, second, third and fourth preferred embodiments of the present invention respectively, the face recognition method is applied in a face recognition system, and the face recognition system comprises a storage module, a detection module, a recognition module, a filtering module, a processing module and a display module. The face recognition method of the present invention comprises the following steps:

S201: Use the storage module to store a plurality of face recognition codes, a plurality of face images corresponding to the plurality of face recognition codes or face coordinates in the plurality of face images as shown in FIG. 2.

S202: Use the detection module to detect the face coordinates in the plurality of face images.

S203: Use the recognition module to identify the plurality of face images, and obtain a face recognition code corresponding to the plurality of face images or a corresponding similarity of the plurality of face images.

S204: Use the filtering module to filter the plurality of face images with the same face recognition code. In other words, the same face recognition code should not show up repeatedly under normal circumstances, thence providing the filtering module can avoiding this problem.

S205: Use the processing module to calculate an overlap rate of the $(T-1)^{th}$ face image that overlaps the $T^{th}$ face image in the plurality of face images, and determines whether the overlap rate is greater than or equal to 30% of the preset value. Wherein, the overlap rate has a preset threshold value preferable set to 30%, but the invention is not limited to this percentage only.

S206: Use the processing module to accumulate a depletion value, and determine whether the depletion value is greater than a preset value $T_M$, if the processing module determines that the overlap rate of the face coordinates in the plurality of face images is smaller than 30%.

S207: Use the processing module to delete the face coordinates of the plurality of face images or the plurality of face recognition codes of the face coordinates, if the processing module determines that the depletion value is greater than the preset value $T_M$.

S2071: Use the filtering module to filter the plurality of face images having the same face recognition code.

Figure 3:
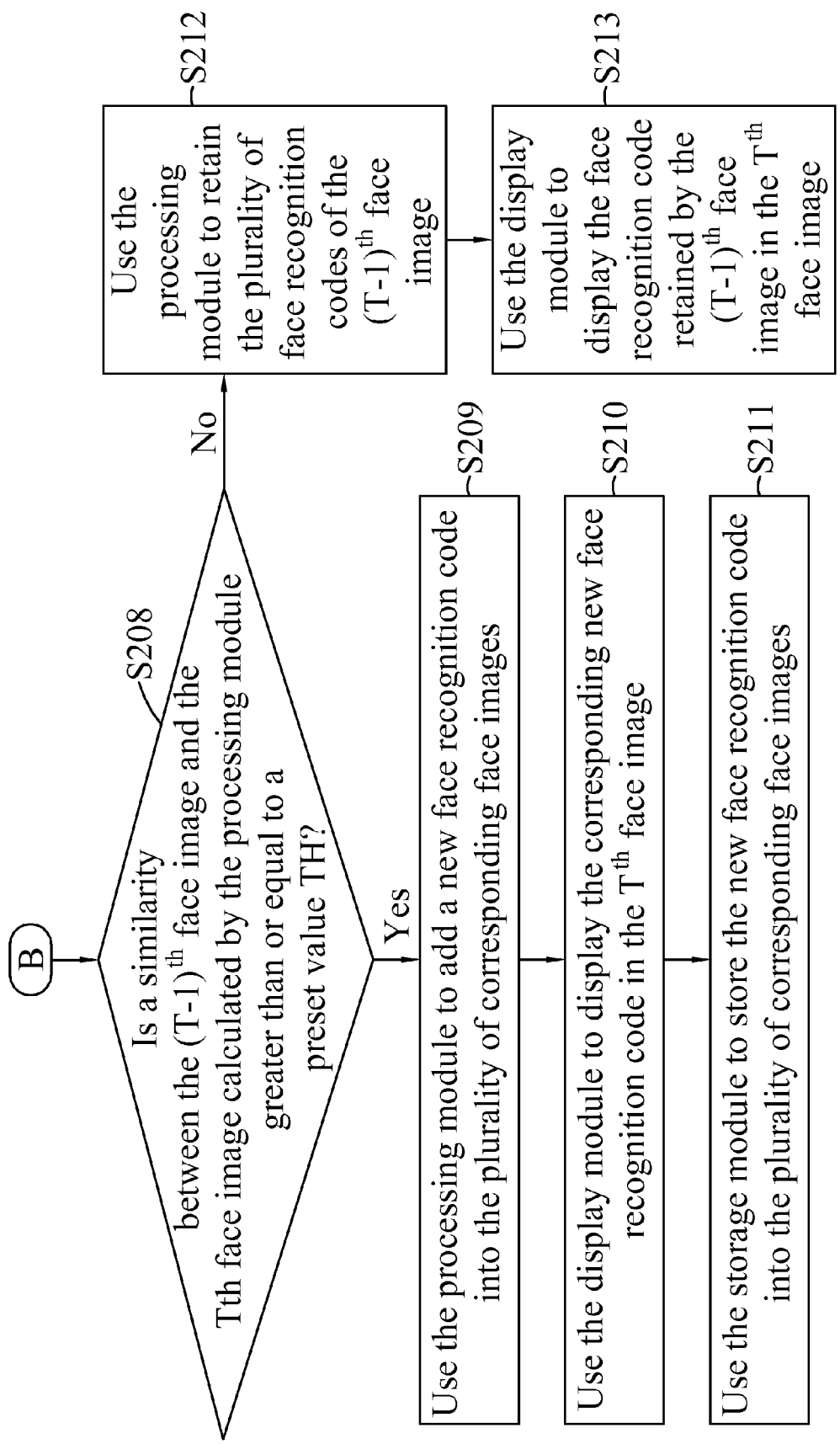
FIG. 3 is a second flow chart of a face recognition method in accordance with the second preferred embodiment of the present invention.

S208: Use the processing module to calculate a similarity between the $(T-1)^{th}$ face image and the $T^{th}$ face image and determine whether the similarity is greater than or equal to a preset value TH as shown in FIG. 3, if the processing module determines that the depletion value has not exceeded the preset value $T_M$ in the step S206.

S209: Use the processing module to add a new face recognition code into the plurality of corresponding face images, if the processing module determines that the similarity is greater than or equal to the preset value TH.

S210: Use the display module to display the corresponding new face recognition code in the $T^{th}$ face image.

S211: Use the storage module to store the new face recognition code into the plurality of corresponding face images.

S212: Use the processing module to retain the plurality of face recognition codes of the $(T-1)^{th}$ face image, if the processing module determines that the similarity is smaller than preset value TH in the step S208.

S213: Use the display module to display the face recognition code retained by the $(T-1)^{th}$ face image in the $T^{th}$ face image.

Figure 4:
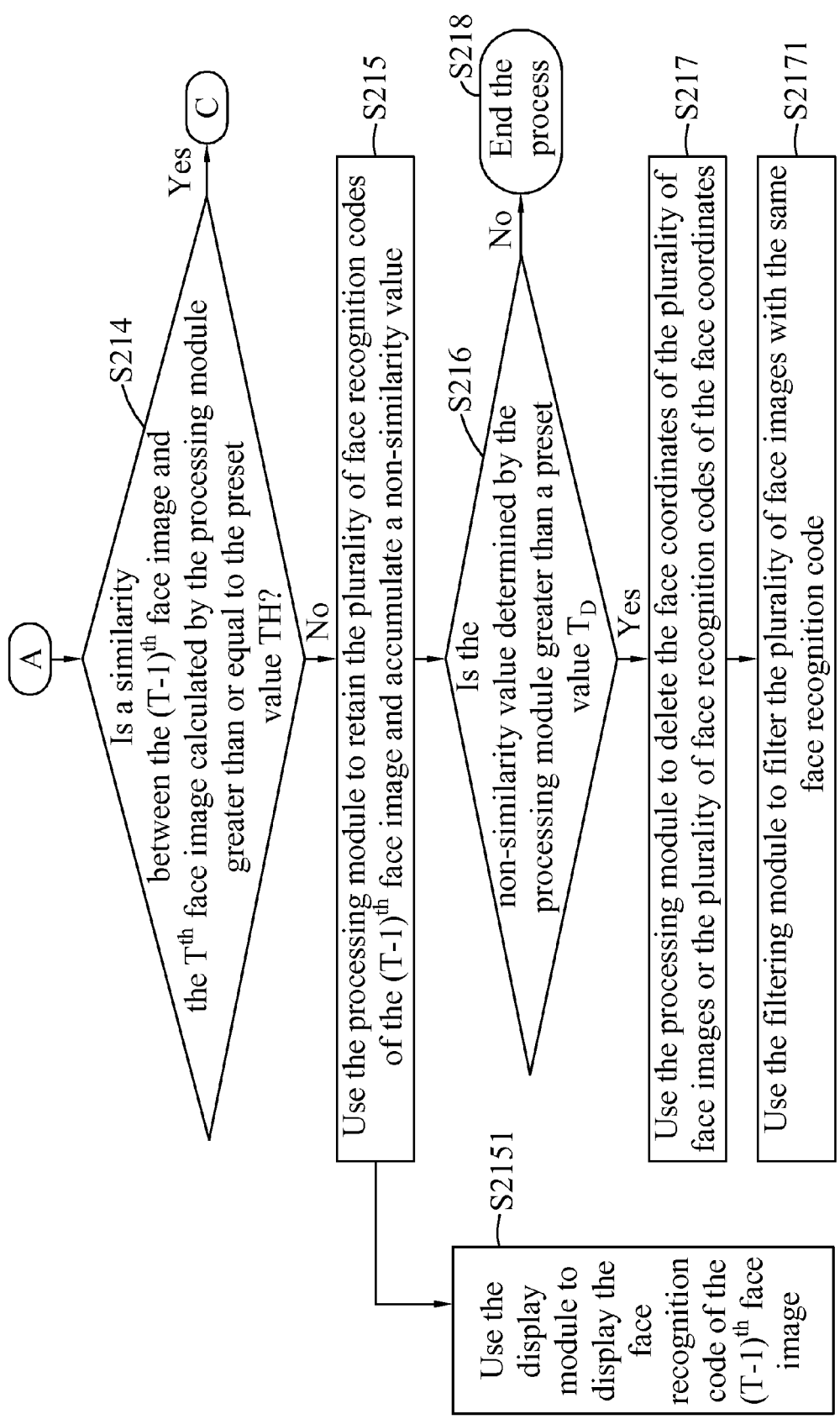
FIG. 4 is a third flow chart of a face recognition method in accordance with the second preferred embodiment of the present invention.

If the processing module determines that the overlap rate of the face coordinates in the plurality of face images is greater than or equal to 30% of the preset value in the step S205, the step 214 as shown in FIG. 4 takes place. In other words, if the overlap rate is greater than 30%, it indicates that the face image and the plurality of face images stored in the storage module have a very high possibility to have the same face recognition code.

S214: Use the processing module to calculate a similarity between the $(T-1)^{th}$ face image and the $T^{th}$ face image and determine whether the similarity is greater than or equal to the preset value TH.

S215: Use the processing module to retain the plurality of face recognition codes of the $(T-1)^{th}$ face image and accumulate a non-similarity value, if the similarity between the $(T-1)^{th}$ face image and the $T^{th}$ face image is smaller than the preset value TH.

S2151: Use the display module to display the face recognition code of the $(T-1)^{th}$ face image.

S216: Use the processing module to determine whether the non-similarity value is greater than a preset value $T_D$.

S217: Use the processing module to delete the face coordinates of the plurality of face images or the plurality of face recognition codes of the face coordinates, if the non-similarity value is greater than a preset value $T_D$.

S218: End the process, if the non-similarity value is not greater than the preset value $T_D$.

Wherein, a step S2171 is executed after the step 217.

S2171: Use the filtering module to filter the plurality of face images with the same face recognition code.

Figure 5:
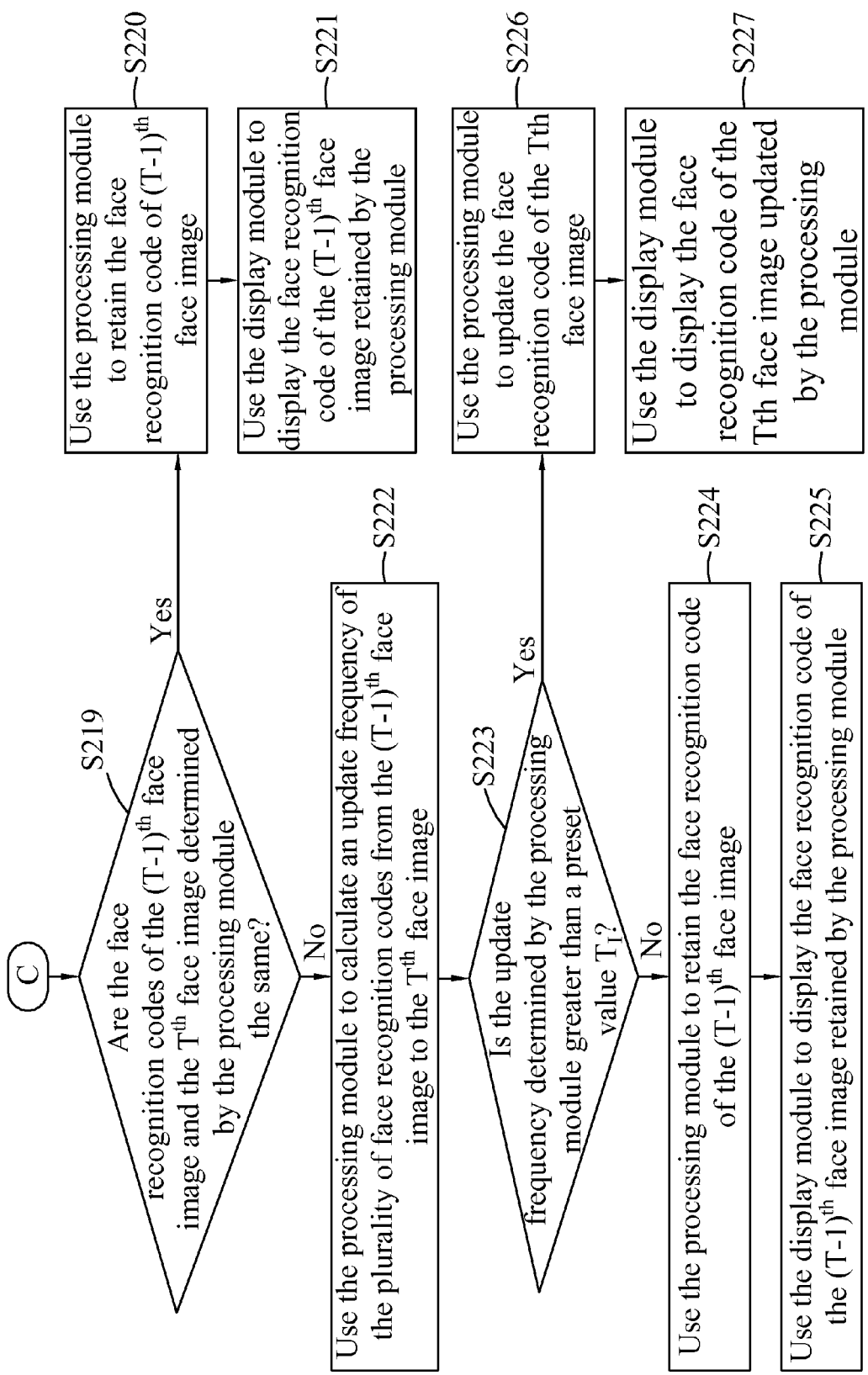
FIG. 5 is a fourth flow chart of a face recognition method in accordance with the second preferred embodiment of the present invention.

S219: Use the processing module to compare and determine whether the face recognition codes of the $(T-1)^{th}$ face image and the $T^{th}$ face image are the same as shown in FIG. 5, if the similarity between the $(T-1)^{th}$ face image and the $T^{th}$ face image is greater than or equal to the preset value TH in the step S214.

S220: Use the processing module to retain the face recognition code of the $(T-1)^{th}$ face image, if the face recognition codes of the $(T-1)^{th}$ face image and the $T^{th}$ face image are the same.

S221: Use the display module to display the face recognition code of the $(T-1)^{th}$ face image retained by the processing module.

S222: Use the processing module to calculate an update frequency of the plurality of face recognition codes from the $(T-1)^{th}$ face image to the $T^{th}$ face image, if the face recognition codes of the $(T-1)^{th}$ face image and the $T^{th}$ face image are different.

S223: Use the processing module to determine whether the update frequency is greater than a preset value $T_I$.

S224: Use the processing module to retain the face recognition code of the $(T-1)^{th}$ face image, if the update frequency is smaller than preset value $T_I$.

S225: Use the display module to display the face recognition code of the $(T-1)^{th}$ face image retained by the processing module.

S226: Use the processing module to update the face recognition code of the $T^{th}$ face image, if the step S223 determines that the update frequency is greater than preset value $T_I$.

S227: Use the display module to display the face recognition code of the $T^{th}$ face image updated by the processing module.

Wherein, T is a positive integer greater than zero, and persons ordinarily skilled in the art can define the numeric values of the preset values flexibly such as 30%, $T_M$, TH, $T_D$ and $T_I$ depending on the requirements of the design.

The details and implementation method of the face recognition system of the present invention have been described in the section of the face recognition method of the present invention, and thus will not be repeated.

What is claimed is:

1. A face recognition system, comprising:
    a storage module, arranged for storing a plurality of face recognition codes, a plurality of face images corresponding to the plurality of face recognition codes, or face coordinates in the plurality of face images;
    a processing module, arranged for calculating an overlap rate of a (T−1)th face image that overlaps a Tth face image in the plurality of face images, and wherein when the processing module determines that the overlap rate is greater than a first preset value, the processing module calculates a similarity between the (T−1)th face image and the Tth face image, and if the similarity is smaller than a second preset value, the processing module retains the face recognition code of the (T−1)th face image, otherwise, the processing module compares the face recognition codes of the $(T-1)^{th}$ face image and the $T^{th}$ face image, if the face recognition codes of the $(T-1)^{th}$ face image and the $T^{th}$ face image are different, the processing module calculates an update frequency of the plurality of face recognition codes from the $(T-1)^{th}$ face image to the $T^{th}$ face image, and determines whether the update frequency is greater than a third preset value, and if the update frequency is greater than the third preset value, the processing module updates the face recognition code of the $T^{th}$ face image; and
    a display module, arranged for displaying the corresponding face recognition code in the $T^{th}$ face image;
    wherein, T is a positive integer greater than zero.

2. The face recognition system of claim 1, wherein when the processing module determines that the similarity is greater than the second preset value, the processing module compares the face recognition codes of the $(T-1)^{th}$ face image with the $T^{th}$ face image; and the processing module retains the face recognition code of the $(T-1)^{th}$ face image when the face recognition codes of the $(T-1)^{th}$ face image and the $T^{th}$ face image are the same.

3. The face recognition system of claim 1, wherein when the processing module determines that the overlap rate of the face coordinates in the plurality of face images is smaller than the first preset value, the processing module accumulates a depletion value and determines whether the depletion value is greater than a fourth preset value; and the processing module deletes the face coordinates of the plurality of face images or the plurality of face recognition codes of the face coordinates if the processing module determines that the depletion value is greater than the fourth preset value.

4. The face recognition system of claim 3, wherein the processing module retains the face coordinates in the plurality of face images or the plurality of face recognition codes of the face coordinates when the processing module determines that the depletion value is smaller than the fourth preset value.

5. The face recognition system of claim 3, wherein when the processing module accumulates the depletion value, the processing module calculates the similarity according to the plurality of face images and determines whether the similarity is greater than the second preset value.

6. The face recognition system of claim 5, wherein when the processing module determines that the similarity is greater than the second preset value, the processing module adds a new face recognition code into the plurality of corresponding face images.

7. The face recognition system of claim 5, wherein when the processing module determines that the similarity is smaller than the second preset value, the processing module retains the plurality of face recognition codes of the $(T-1)^{th}$ face image.

8. The face recognition system of claim 1, further comprising a recognition module for identifying the plurality of face images to obtain the face recognition code corresponding to the plurality of face images or a corresponding similarity of the plurality of face images.

9. The face recognition system of claim 8, further comprising a filtering module for sorting the plurality of face images with the same face recognition code according to the corresponding similarity, and obtaining the plurality of face images with a similarity greater than a fifth preset value, and filtering the plurality of face images with a corresponding similarity smaller than the fifth preset value.

10. A face recognition method, applied in a face recognition system, and the face recognition system comprising a storage module, a processing module and a display module, and the face recognition method comprising the steps of:
  using the storage module to store a plurality of face recognition codes, a plurality of face images corresponding to the plurality of face recognition codes, or face coordinates in the plurality of face images;
  using the processing module to calculate an overlap rate of a $(T-1)^{th}$ face image that overlaps a $T^{th}$ face image in the plurality of face images;
  using the processing module to calculate a similarity between the $(T-1)^{th}$ face image and the $T^{th}$ face image, if the processing module determines that the overlap rate is greater than a first preset value;
  using the processing module to retain the face recognition code of the $(T-1)^{th}$ face image, if the similarity is smaller than a second preset value;
  using the processing module to compare the $(T-1)^{th}$ face image with the $T^{th}$ face image to determine whether the face recognition codes thereof are the same, if the processing module determines that the similarity is greater than the second preset value:
  using the processing module to calculate a update frequency of the plurality of face recognition codes from the $(T-1)^{th}$ face image to the $T^{th}$ face image, if the face recognition codes of the $(T-1)^{th}$ face image and the $T^{th}$ face image are different;
  using the processing module to determine whether the update frequency is greater than a third preset value;
  using the processing module to update the face recognition code of the $T^{th}$ face image, if the update frequency is greater than the third preset value;
  using the processing module to retain the face recognition code of the $(T-1)^{th}$ face image, if the update frequency is smaller than the third preset value; and
  using the display module to display the corresponding face recognition code in the $T^{th}$ face image;
  wherein, T is a positive integer greater than zero.

11. The face recognition method of claim 10, further comprising the step of:
  using the processing module to retain the face recognition code of the $(T-1)^{th}$ face image, if the face recognition codes of the $(T-1)^{th}$ face image and the $T^{th}$ face image are the same.

* * * * *